United States Patent
Wang et al.

(10) Patent No.: US 7,810,476 B2
(45) Date of Patent: Oct. 12, 2010

(54) METHOD AND APPARATUS FOR ESTIMATING EXHAUST TEMPERATURE OF AN INTERNAL COMBUSTION ENGINE

(75) Inventors: Yue-Yun Wang, Troy, MI (US); Yongsheng He, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/682,377

(22) Filed: Mar. 6, 2007

(65) Prior Publication Data

US 2008/0216557 A1    Sep. 11, 2008

(51) Int. Cl.
*F02B 47/08* (2006.01)

(52) U.S. Cl. .................. 123/568.16; 701/101; 701/102; 60/605.1; 60/605.2

(58) Field of Classification Search .................. 123/305, 123/435, 295, 299, 436, 494; 60/605.2, 605.1, 60/600, 612, 785; 701/101–104, 114, 116; *F02B 47/08*
See application file for complete search history.

(56) References Cited

U.S. PATENT DOCUMENTS

| | | | |
|---|---|---|---|
| 5,682,317 A | * | 10/1997 | Keeler et al. ................. 701/101 |
| 5,755,212 A | | 5/1998 | Ajima |
| 6,085,575 A | | 7/2000 | Wienand et al. |
| 6,116,083 A | | 9/2000 | Cullen et al. |
| 6,276,334 B1 | * | 8/2001 | Flynn et al. ................. 123/435 |
| 6,298,299 B1 | | 10/2001 | Itoyama et al. |
| 6,508,242 B2 | | 1/2003 | Jaliwala et al. |
| 6,732,522 B2 | | 5/2004 | Wright et al. |
| 6,755,078 B2 | | 6/2004 | Hernandez et al. |
| 7,313,918 B2 | * | 1/2008 | Melchior ................... 60/605.2 |

* cited by examiner

*Primary Examiner*—Stephen K Cronin
*Assistant Examiner*—Keith Coleman

(57) ABSTRACT

The invention comprises a method and an article of manufacture to estimate exhaust gas temperature of an internal combustion engine during ongoing operation of the engine. This comprises determining states of a plurality of parameters of a combustion charge. A heat release of the combustion charge is estimated based thereon, and an exhaust gas temperature is estimated based upon the estimated heat release. Exemplary parameters of the combustion charge comprise engine speed, mass air flowrate, engine fueling and fuel injection timing, and, recirculated exhaust gas fraction.

22 Claims, 8 Drawing Sheets

METHOD AND APPARATUS FOR ESTIMATING EXHAUST TEMPERATURE OF AN INTERNAL COMBUSTION ENGINE

TECHNICAL FIELD

This invention pertains generally to internal combustion engines, and more specifically to determining an exhaust gas temperature thereof.

BACKGROUND OF THE INVENTION

The statements in this section merely provide background information related to the present disclosure and may not constitute prior art.

Modern internal combustion engines are equipped with sophisticated systems to monitor and control various aspects of engine performance during ongoing operation, to meet operator demands for performance, including torque and fuel economy, and to satisfy government regulations related to emissions, safety, and fuel economy. Such systems include sensing devices and actuators connected to one or more control modules which execute computer programs to monitor and control engine operation during ongoing operation.

Exhaust gas temperature is an important parameter used by engine system designers. By way of illustration of a need for an accurate determination of exhaust gas temperature, emissions requirements have led to implementation of exhaust gas recirculation (EGR) systems combined with aftertreatment systems to reduce engine emissions. Control of exhaust gas recirculation requires an accurate determination of EGR mass flow. Such methods include calculating EGR flow from a gas flow equation through an orifice, and, determining a difference between charge air mass flow and fresh air mass flow. Such calculations use engine exhaust pressure as one of the input variables. Some engine manufacturers have implemented an exhaust pressure sensor to determine exhaust pressure, while others have considered exhaust pressure estimation. A typical calculation of EGR flow is as follows, in Eq. 1:

$$\dot{m}_{egr} = C * A * \frac{P_{ex}}{\sqrt{R * T_{egr}}} f\left(\frac{P_{im}}{P_{ex}}\right) \quad [1]$$

wherein $P_{ex}$ comprises exhaust pressure, $P_{im}$ comprises intake manifold pressure, $T_{egr}$ is EGR gas temperature exiting from an EGR cooler; C is a discharge coefficient; and, A comprises valve affected area. Determination of the exhaust pressure $P_{ex}$ through estimation requires some knowledge of exhaust gas temperature input to perform the estimation.

Furthermore, diagnostic regulations for diesel engines require detection of fouling or plugging of an EGR gas cooler when it causes increases in engine emissions. To monitor EGR cooler fouling, it often requires knowledge of EGR gas temperatures into and out of the EGR cooler. The EGR gas temperature into the EGR cooler is the exhaust gas temperature.

Exhaust gas temperature monitoring can be used to provide other operations. These include a feedback control system for protecting exhaust components, including a turbine for a turbocharged system. Exhaust gas temperature monitoring can also be used in managing exhaust gas feedstream temperature to various emissions devices implemented on a vehicle.

It may be preferable to estimate exhaust gas temperature to reduce system costs, including costs for the sensor and wiring harness. Furthermore a system which implements a physical sensor to measure exhaust gas temperature is required to monitor operation of the sensor for faults, adding further complexity to the system.

Current algorithmic models to determine and estimate exhaust gas temperature comprise non-linear models which require significant computational resources and affect throughput of an on-board control module. Furthermore, empirical models for a conventional combustion system are not readily adapted to work with systems utilizing premix charge ignition (PCI) combustion having high EGR flow rates.

Therefore, there is a need to estimate exhaust gas temperature for an internal combustion engine which addresses the above.

SUMMARY OF THE INVENTION

In accordance with an embodiment of the invention, there is provided a method and an article of manufacture to estimate exhaust gas temperature of an internal combustion engine during ongoing operation of the engine. This comprises determining states of a plurality of parameters of an intake combustion charge. A heat release of the combustion charge is estimated based thereon, and an exhaust gas temperature is estimated based upon the estimated heat release. Exemplary parameters of the combustion charge comprise engine speed, mass air flowrate, engine fueling and fuel injection timing, and, recirculated exhaust gas fraction.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
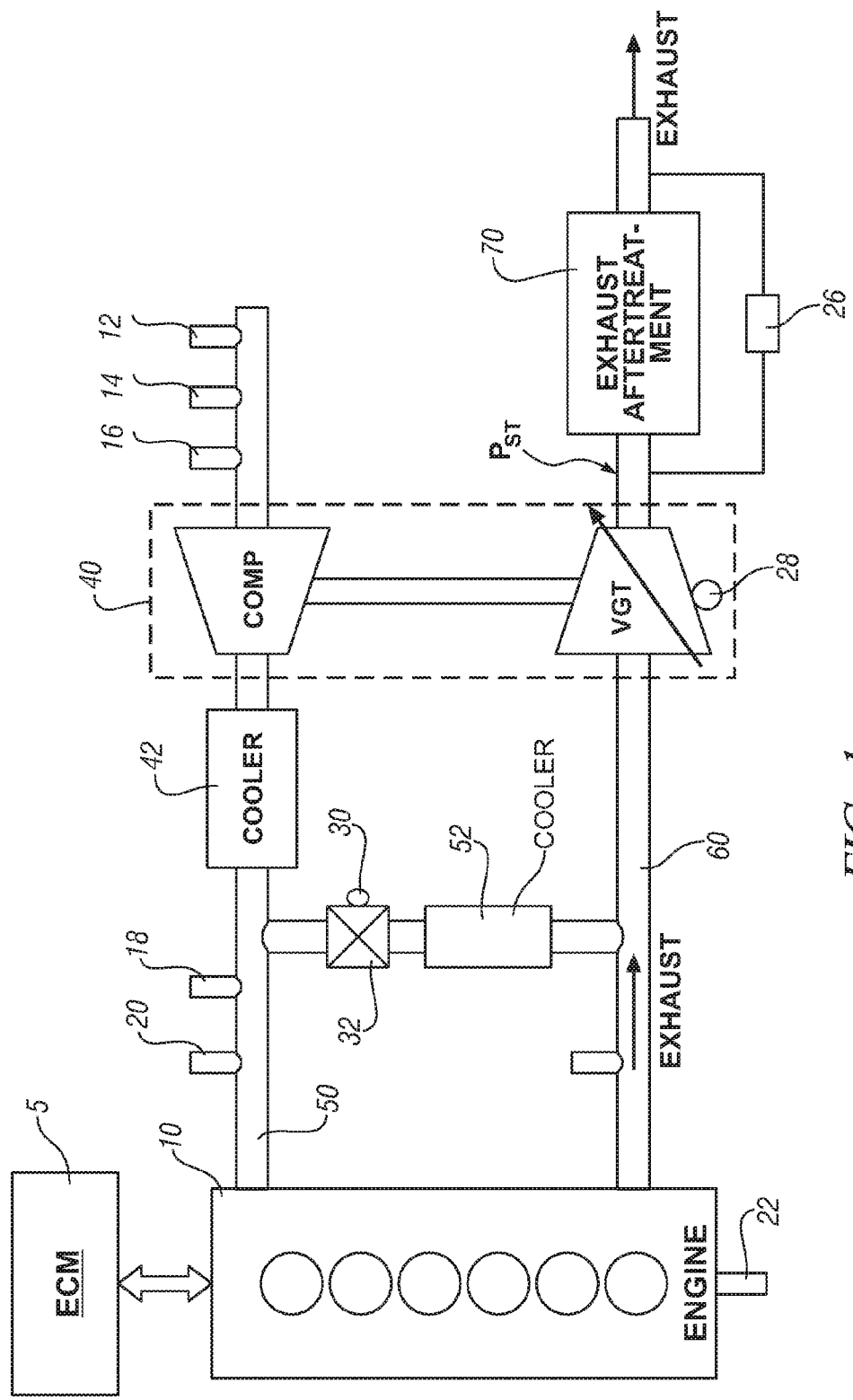
FIG. 1 is a schematic diagram of an exemplary engine system, in accordance with the present invention.

Referring now to the drawings, wherein the showings are for the purpose of illustrating the invention only and not for the purpose of limiting the same, FIG. 1 depicts an engine 10 and engine control module (ECM) 5 which has been constructed in accordance with an embodiment of the invention. The exemplary engine 10 comprises a multi-cylinder internal combustion engine mechanized to operate in a compression-ignition configuration, although this invention is not meant to be limited to compression-ignition engine configurations. Variable displacement combustion chambers are formed in the cylinders between an engine head and reciprocating pistons that are attached to a crankshaft. Engine system components include an intake air compressing device 40 comprising a variable geometry turbine device (VGT) and an air compressor (COMP), a charge air cooler 42, an exhaust gas recirculation (EGR) valve 32 and cooler 52, an intake manifold 50, and exhaust manifold and down-pipe 60, and an exhaust aftertreatment system 70, comprising, e.g., an oxidation catalyst and a diesel particulate filter. Sensing devices are installed on the engine to monitor physical characteristics and generate signals which are correlatable to engine and ambient parameters. The sensing devices preferably comprise an ambient air pressure sensor 12, an ambient or intake air temperature sensor 14, and a mass air flow sensor 16, all which can be configured individually or as a single integrated device; an intake manifold air temperature sensor 18, and an intake manifold pressure sensor 20. There is a VGT position sensor 28 and an EGR valve position sensor 30. An engine speed sensor 22 monitors rotational speed in revolutions per minute (RPM) of the engine. A pressure sensor 26 monitors a pressure drop across the exhaust aftertreatment system 70, which preferably includes monitoring pressure output of the VGT of the intake air compressing device 40, into the exhaust system. Each of the sensing devices is signally connected to the ECM 5 to provide signal information which is transformed by the ECM to information representative of the state of the respective monitored parameter. It is understood that this configuration is illustrative, not restrictive, including the various sensing devices being replaceable within functional equivalent devices and algorithms and still fall within the scope of the invention. Furthermore, the intake air compressing device 40 can comprise turbocharger and supercharger devices within the scope of the invention.

The sensors are operative to provide states of engine and system operating parameters, represented herein as follows:

$\dot{M}_a$ fresh mass air flow sensor 16;
$T_{im}$ intake manifold temperature sensor 18;
$P_{im}$ intake manifold pressure sensor 20;
$T_{am}$ ambient temperature sensor 14;
$P_{am}$ ambient pressure sensor 12;
VGTp VGT position sensor 28;
EGVp EGR valve position sensor 30;
RPM engine speed sensor 22; and,
ΔP exhaust aftertreatment delta pressure sensor 26.

The ECM 5 is an element of an overall vehicle control system, preferably comprising a distributed control module architecture operable to provide coordinated system control. The ECM is operable to synthesize pertinent information and inputs from the aforementioned sensing devices, and execute algorithms to control various actuators to achieve control targets, including such parameters as fuel economy, emissions, performance, driveability, and diagnose and protect hardware. The ECM 5 is preferably a general-purpose digital computer generally comprising a microprocessor or central processing unit, storage mediums comprising read only memory (ROM), random access memory (RAM), electrically programmable read only memory (EPROM), i.e., non-volatile memory, high speed clock, analog to digital (A/D) and digital to analog (D/A) circuitry, and input/output circuitry and devices (I/O) and appropriate signal conditioning and buffer circuitry. A set of control algorithms, comprising resident program instructions and calibrations, is stored in ROM and executed to provide the respective functions. Algorithms are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using predetermined calibrations Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Figure 2:
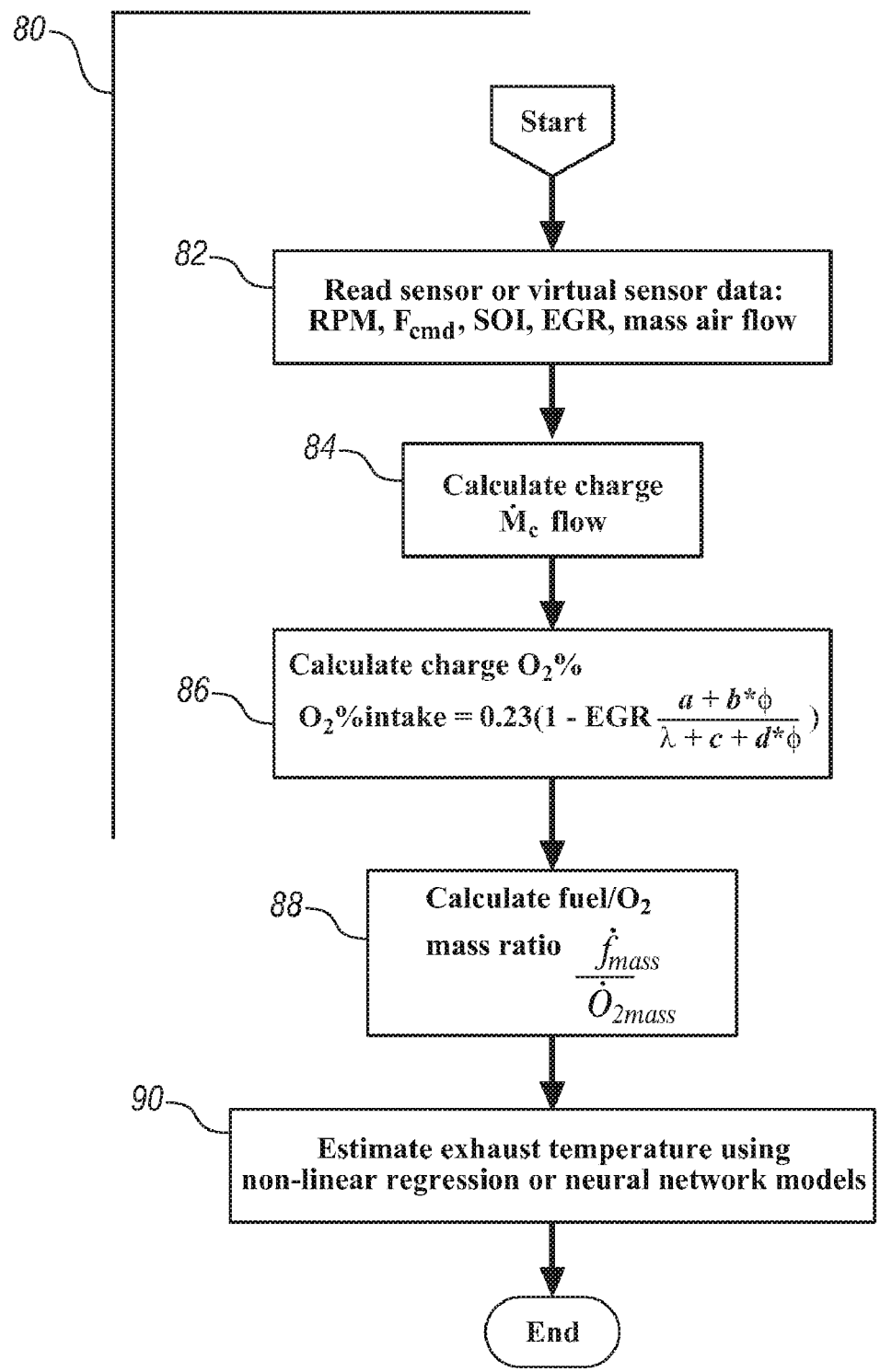
FIG. 2 is a graphical depiction of an algorithmic flowchart, in accordance with the present invention.

Referring now to FIG. 2, the invention comprises a method 80, preferably executed as one or more algorithms in the ECM 5, to estimate exhaust gas temperature in the exhaust system 60 of the exemplary engine 10 illustrated and described herein. The exhaust gas temperature is of interest for control schemes and systems which monitor temperatures of exhaust gas feedstream entering the EGR system upstream of cooler 52, entering the intake air compressing device 40, and entering the exhaust aftertreatment system 70.

In operation, the system determines operating states for various engine parameters affecting the combustion charge (Step 82), including engine speed (RPM), commanded fuel mass (mg) per injection event ($F_{cmd}$), timing of start of fuel injection (SOI), commanded or estimated EGR flow, timing of intake valve closing (IVC) typically in terms of crank position, and mass air flow ($\dot{M}_a$). A charge mass flow $\dot{M}_c$ is calculated, which comprises mass flow of total charge into the engine (Step 84), and as shown in Eq. 6, below. From this, an intake charge mass flow of oxygen gas ($O_2$% intake or $\dot{O}_{2mass}$), can be determined (Step 86), as described in Eq. 7, below. A fuel/O2 mass ratio (F02R) is determined (Step 88), as described by Eq. 3, below. The exhaust temperature, $T_{ex}$, can be determined based upon states of the above-mentioned parameters and intake temperature $T_{im}$, as depicted in Eq. 2:

$$T_{ex}=T_{im}+g(FO2R,EGR,SOI,RPM,IVC). \qquad [2]$$

The exhaust gas temperature $T_{ex}$ is estimated by one of a plurality of methods, including executing equations derived from the temperature of intake gases and non-linear regressions of experimentally derived parametric states, and alternatively, by executing a neural network model (Step 90). The method is now described in greater detail.

Figure 3:
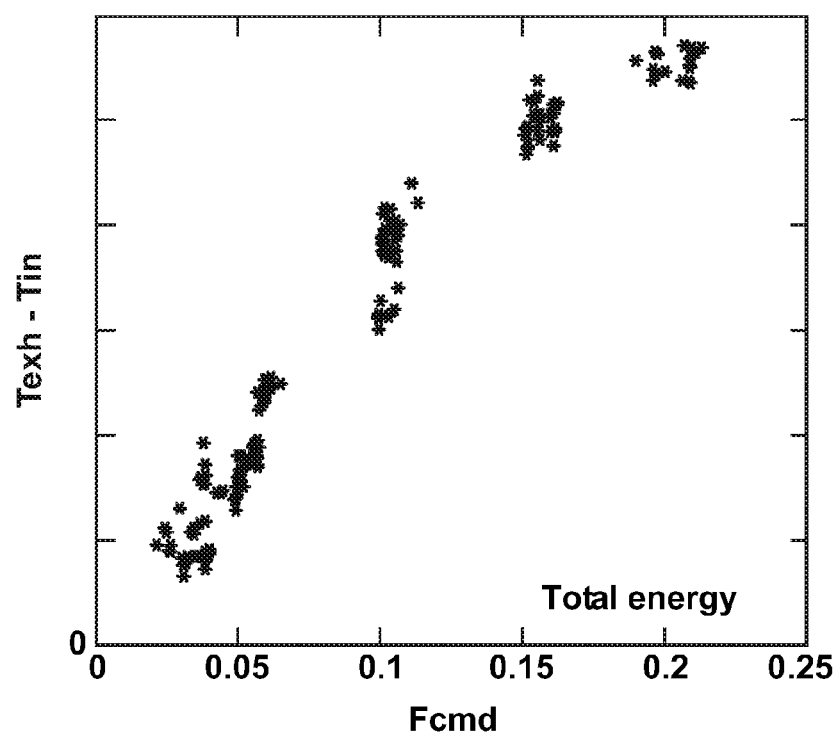
FIGS. 3-8 are graphical data depictions, in accordance with the present invention.

The exhaust gas temperature estimation algorithm described herein relies upon input states the engine operating parameters which affect exhaust gas temperature and are typically available using existing sensors and on-board algorithms. Increases in combustion gas temperatures through the engine can be based upon the fuel/air equivalence ratio φ, i.e., fuel/air ratio, adjusted for EGR dilution and other factors related to the charge ignition mode (e.g., premixed charge ignition mode). In this invention, fuel mass in each combustion chamber (identified as a primary factor to release energy or heat affecting exhaust gas temperature) is calculated from the engine fueling command $F_{cmd}$ (e.g., fuel flow/injection stroke, mg/str) for each combustion charge. Referring now to FIG. 3, a graph depicting a typical relationship between mass of fuel burned during combustion and temperature increase from an intake charge to an exhaust charge is provided. The results demonstrate an increase in the engine fueling command results in an increase in a differential between intake air-exhaust air temperature ('Texh-Tin'), and hence an increase in the exhaust gas temperature.

Figure 4:
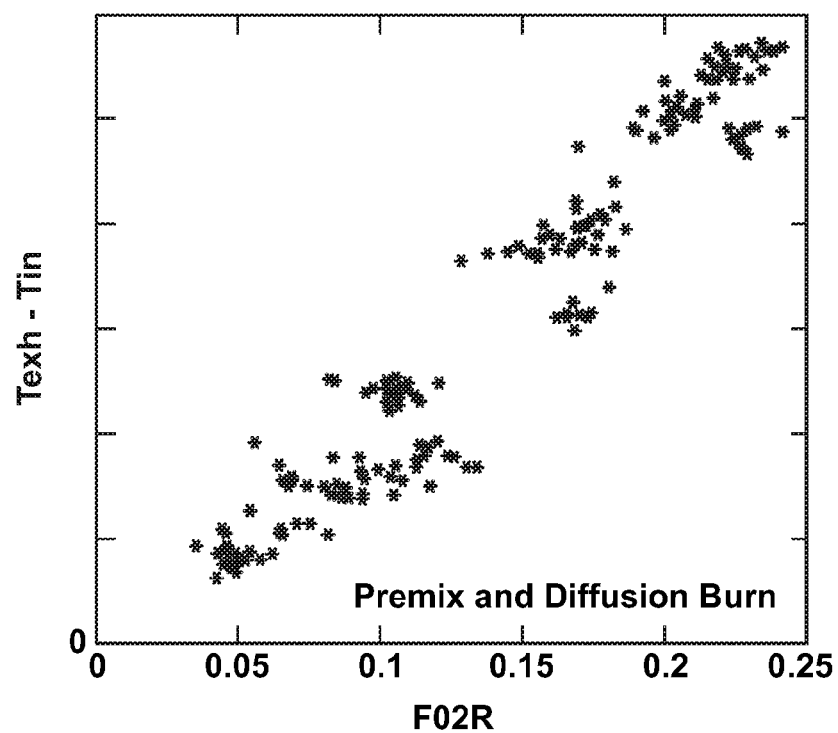

Referring now to FIG. 4, a graph depicting a typical relationship between the fuel/02 mass ratio (F02R) and temperature increase from an intake charge to exhaust ('Texh-Tin') is provided. The results demonstrate that increasing the fuel mass flow per intake charge mass flow of oxygen results in an increase in a differential between intake air-exhaust air temperature (Texh-Tin), and hence an increase in the exhaust gas temperature. Thus, the intake air-exhaust air temperature differential (Texh-Tin) and hence the exhaust gas temperature both increase with an increase in the fuel/oxygen mass ratio (FO2R).

The fuel/O2 mass ratio is defined in Eq. 3, as $$FO2R = \frac{\dot{f}_{mass}}{\dot{O}_{2mass}};  \quad [3]$$

wherein fuel mass flow rate and intake charge mass flow of oxygen are calculated as depicted in Eqs. 4 and 5:

$$\dot{f}_{mass} = \alpha * F_{cmd} * RPM; \text{ and,} \quad [4]$$

$$\dot{O}_{2mass} = O2\%*\dot{M}_c. \quad [5]$$

The charge mass flow rate is defined with reference to Eq. 6:

$$\dot{M}_c = \dot{M}_a/(1-EGR); \quad [6]$$

wherein EGR comprises a measure, in percent, of recirculated exhaust gases that flow into the engine intake for a given charge.

Thus, the intake charge mass flow of oxygen is determined as depicted in Eq. 7:

$$\dot{O}_{2mass} = 0.23 * \dot{M}_c * \left(1 - EGR * \frac{a+b*\phi}{\lambda+c+d*\phi}\right) \quad [7]$$

wherein a, b, c, and d are experimentally derived constants, and $f_{mass}$ comprises mass fuel flowrate (gm/sec), and $\phi$ comprises the fuel/air equivalence ratio. The parameter $\lambda$, i.e., normalized air/fuel ratio, can be determined as stated in Eq. 8, wherein the scalar 14.57 represents nominal stoichiometric ratio for the fuel:

$$\lambda = \frac{1}{\phi} = \frac{\dot{M}_a}{14.57*\dot{f}_{mass}} = \frac{A}{14.57*F} \quad [8]$$

Figure 5:
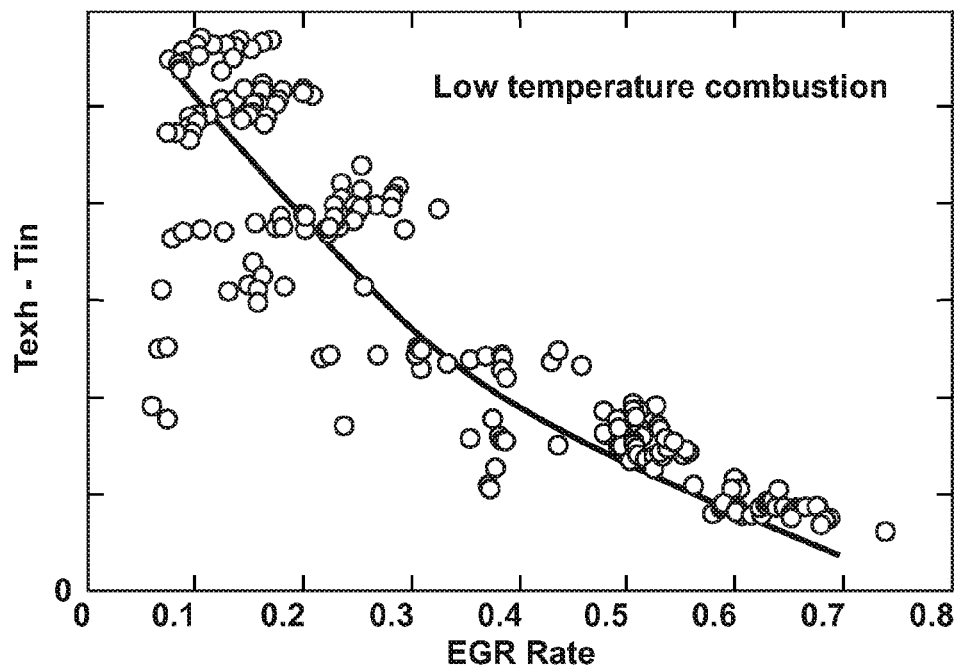

Another factor affecting operation comprises mass flowrate of recirculated exhaust gas (EGR), as a percent of the combustion charge. As the EGR mass flowrate increases, the exhaust gas temperature decreases due to increase in mass of inert gas inducted into the combustion chambers. This effect is demonstrated with reference to FIG. 5, which depicts a decrease in a differential between intake air-exhaust air temperature (Texh-Tin) with an increase in EGR rate or mass per charge.

Figure 6:
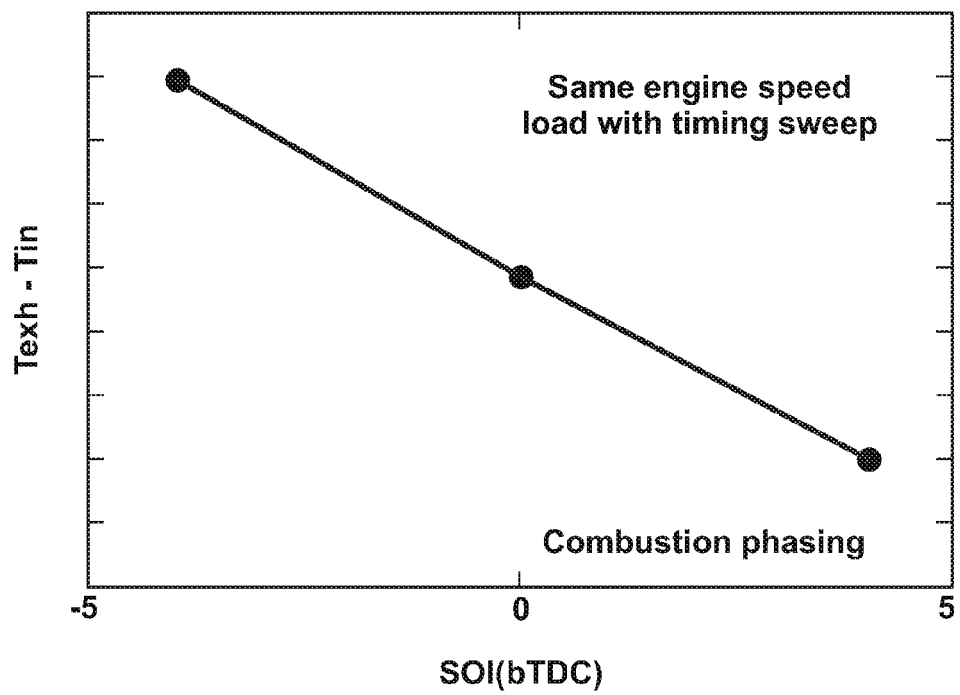

Another factor affecting operation comprises timing of fuel injection, typically controlled by timing of start of injection (SOI) relative to piston position, measured with respect to top-dead-center (TDC). Retarding SOI timing is known to delay combustion heat release, resulting in increased temperatures in each exhaust stroke. This effect is demonstrated with reference to FIG. 6, which depicts a decrease in a differential between intake air-exhaust air temperatures (Texh-Tin) as timing of SOI is retarded, over a range from −5° TDC to +5° TDC.

Another factor affecting operation comprises engine speed. As engine speed increases, there is an increase in friction between each piston and cylinder wall, thus increasing exhaust gas temperatures. Engine speed affects heat transfer to the cylinder wall from the combustion charge, but comprises a lesser factor to be modeled here. Exhaust pressure has a minor effect on exhaust gas temperature. However, when a variable valve train system is used, closing of the intake valve relative to piston position (IVC) affects exhaust gas temperature, wherein exhaust gas temperature decreases with delayed closing of the intake valve, due to lower compression of the intake gas.

Restating Eq. 2, an overall algorithm is provided for estimating the exhaust gas temperature using the state parameters previously described, as depicted in Eq. 9:

$$T_{ex} = T_{im} + f(FO2R, F_{cmd}, EGR, SOI, RPM, IVC). \quad [9]$$

Figure 7:
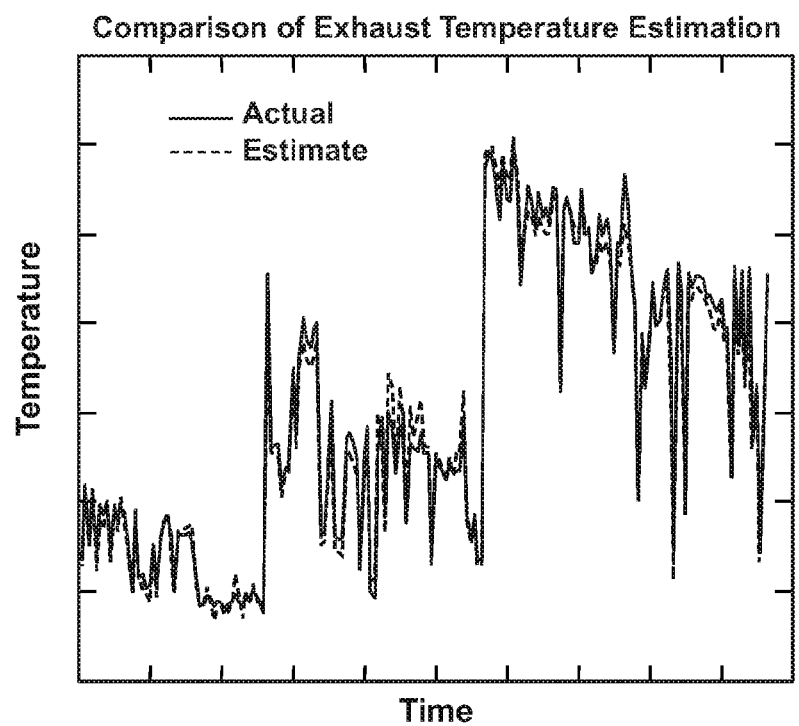

The substance of Eq. 9 can be restated as a non-linear regression exhaust gas temperature model, as in Eq. 10:

$$T_{ex} = \frac{T_{im} + c_1 + c_2 * \frac{\dot{f}_{mass}}{O2} + c_3 *}{EGR^2 + c_4 * \frac{SOI}{rpm} + p1(F_{cmd})} \quad [10]$$

wherein the constants c1, c2, c3, and c4 can be found through a least-squares regression analysis of actual data gathered during preproduction calibration activities. The factor $p1(F_{cmd})$ comprises a polynomial of the fueling command, is typically a third order polynomial, and can be modeled as a precalibrated array. Referring now to FIG. 7, results of execution of a model for an exemplary engine executed in accordance with Eq. 10 are depicted, comparing actual (measured) exhaust gas temperatures and estimated exhaust gas temperatures over a series of test operating points occurring during ongoing engine operation.

Figure 8:
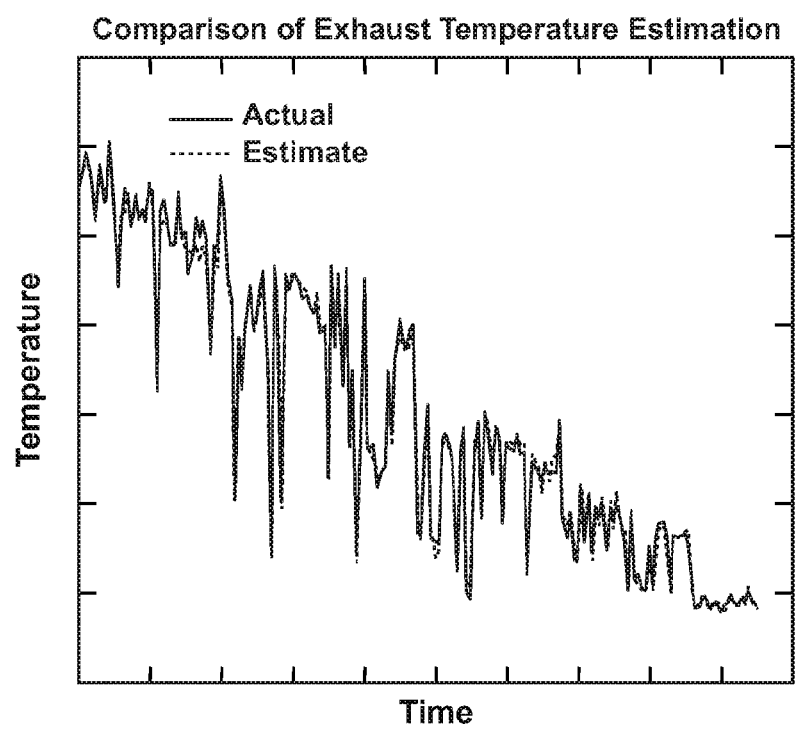

Alternatively, the algorithm for estimating exhaust gas temperature using the operating states for the engine parameters previously described can be restated, as in Eq. 11:

$$T_{ex} = T_{im} + c_1 + c_2 * \frac{\dot{f}_{mass}}{O2} + g_1(rpm, EGR) + \\ g_2(rpm, SOI) + p_1(F_{cmd}) + p_2(VVT) \quad [11]$$

wherein the constants $c_1$ and $c_2$ can be derived through a least-squares regression of actual data gathered during preproduction calibration activities. The factors $g_1(rpm,EGR)$ and $g_2(rpm,SOI)$ comprise predetermined calibrations, typically executed as two-dimensional calibrations stored in tabular array form in non-volatile memory of the control module, with factor $g_1$ determined based upon engine speed and EGR mass, and, factor $g_2$ based upon engine speed and start of injection timing. The factor $p_1(F_{cmd})$ comprises a polynomial equation driven by the fueling command, is typically a third order polynomial, and can be modeled as a pre-calibrated array. The function $p_2(VVT)$ comprises a polynomial equation which is derived by determining effects of intake valve closing (IVC) timing on exhaust gas temperature, which can be modeled as a pre-calibrated relationship executed in tabular array form in the control module. The use of precalibrated relationships executed in arrays to determine the exhaust gas temperature reduces computational load in the control module. Such lookup tables require engine-specific pre-production calibration efforts to develop accurate information. Referring now to FIG. 8, results of executing a model in accordance with Eq. 11 are depicted, comparing actual (measured) exhaust gas temperatures and estimated exhaust gas temperatures over a series of test operating points over a period of time for the exemplary engine.

Figure 9:
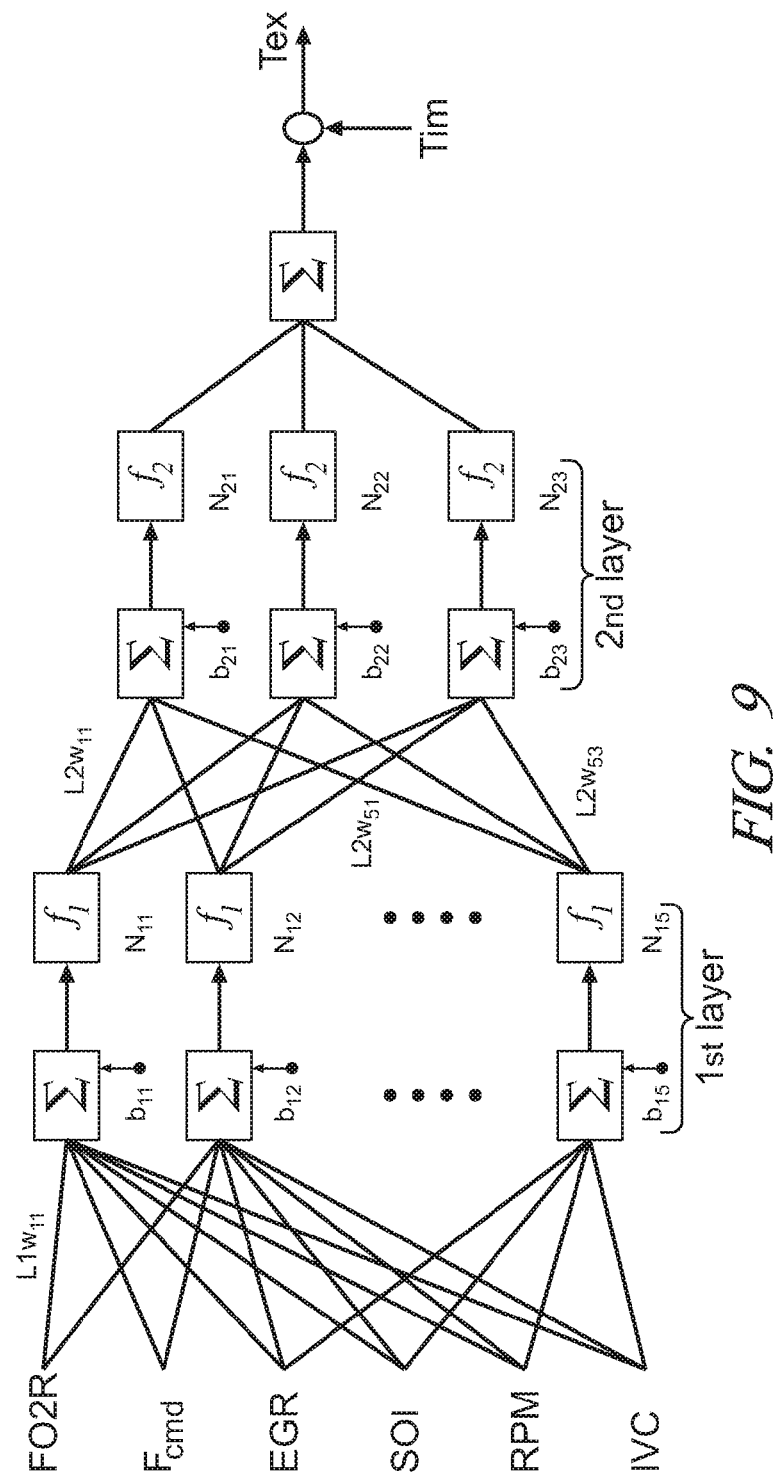
FIG. 9 is a graphical depiction of a neural network, in accordance with the present invention; and, FIGS. 10-12 are graphical data depictions, in accordance with the present invention.
Figure 10:
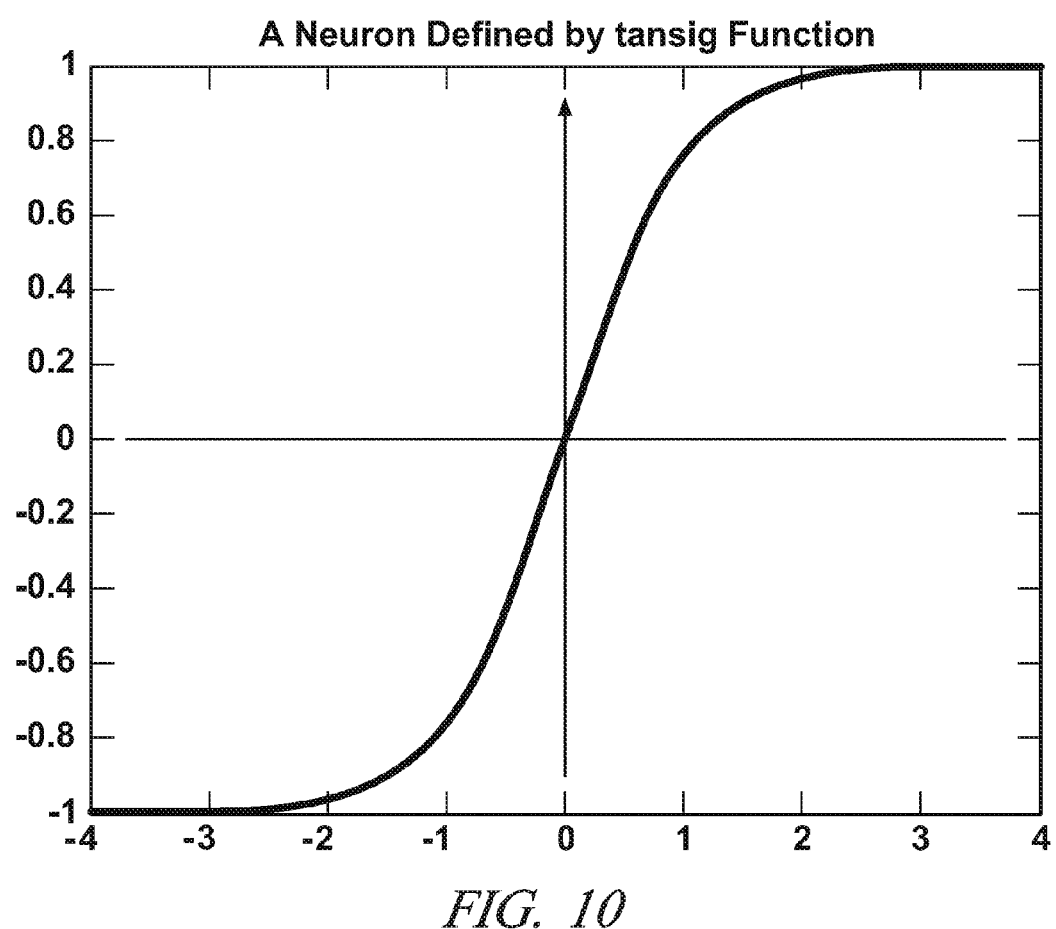

Alternatively, a neural network can be developed and implemented to estimate the exhaust gas temperature. Referring now to FIG. 9, there is depicted a multilayer neural network (NN) which has been constructed in accordance with an embodiment of the invention. Neural networks are known algorithmically executed constructs, and not described in detail herein. The inputs to the NN comprise the engine parameter states of engine speed (RPM), EGR mass flow, fuel command $F_{cmd}$, the fuel/O2 mass ratio FO2R, and intake valve closing timing (IVC), and fuel injection timing (SOI). The first layer of the NN comprises five neurons, and the second layer of the NN has three neurons. Each of the first layer of neurons comprises weighting factors $L1w11$-$L1w55$, a summing function having one of the biases $b_{11}$-$b_{15}$, and one of a tangent-sigmoid (tan-sig) function $N_{11}$-$N_{15}$ as depicted in FIG. 10. Each of the second layer elements comprises weighting factors $L2w11$-$L2w53$, a summing function, having one of the biases $b_{21}$-$b_{23}$, and one of tangent sigmoid (tan-sig) functions $N_{21}$-$N_{23}$. Weightings (w) and biases (b) of the neurons of the NN are trained through known back-propagation algorithms, with the final estimated exhaust gas temperature determined as described in Eq. 12, below:

$$T_{ex} = T_{im} + f_2(L2W^* f_1(L1W^* u + b_1) + b_2); \quad [12]$$

wherein the weighting factors of L2W comprise a 3×5 constant array, the weighting factors of L1W comprise a 5×5 constant array, and the biases are $b_1 = [b_{11}, b_{12}, b_{13}, b_{14}, b_{15}]$, and $b_2 = [b_{21}, b_{22}, b_{23}]$.

The input vector, u, is comprised of states of parameters previously described hereinabove, and is defined in Eq. 13 as follows:

$$u = [FO2R \; F_{cmd} \; EGR \; SOI \; RPM \; IVC]^T. \quad [13]$$

Figure 11:
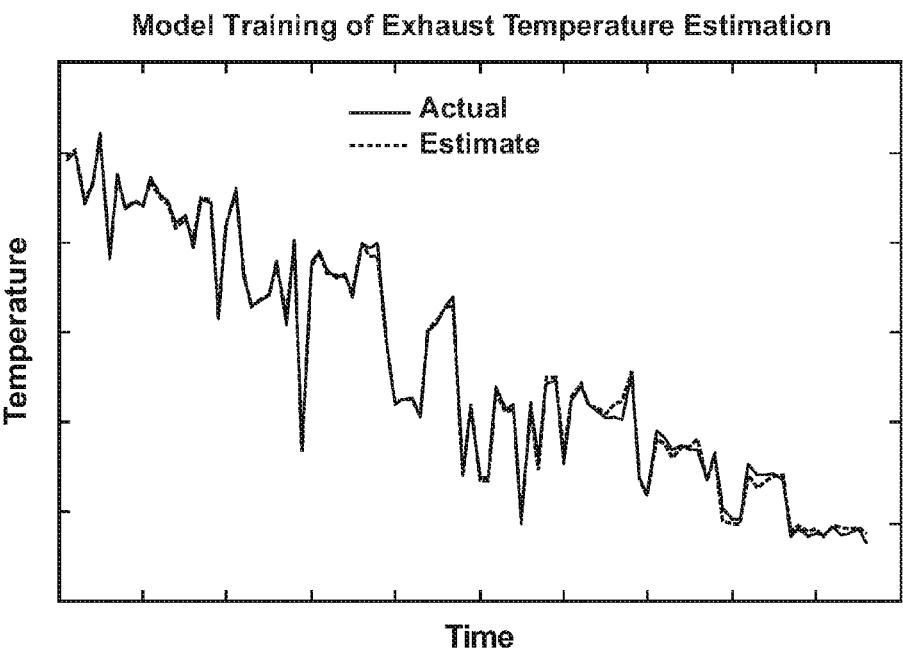
Figure 12:
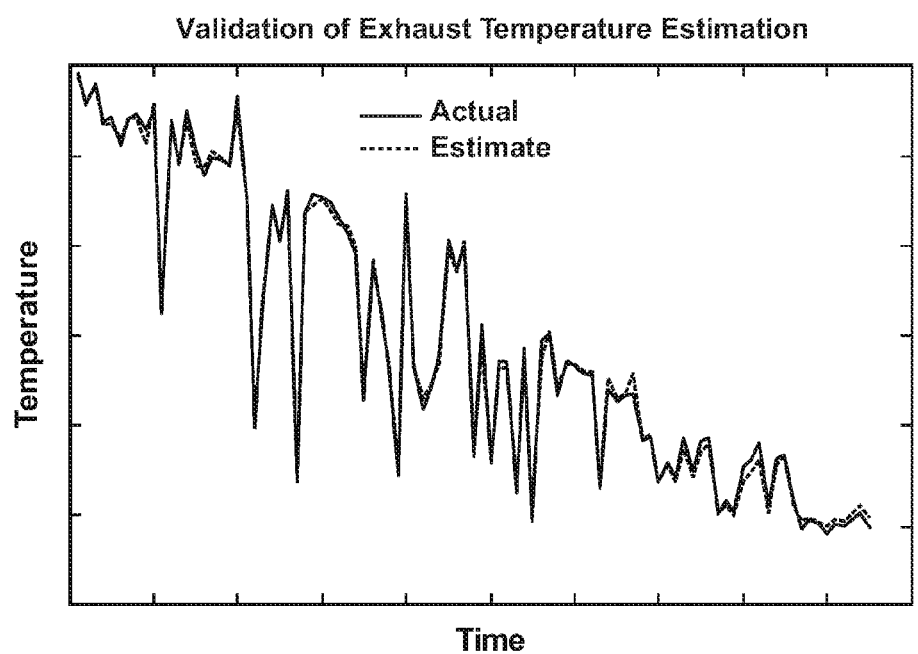

Referring now to FIGS. 11 and 12, results of the NN trained to determine exhaust gas temperature are depicted for a representative engine. The results depict actual and estimated temperatures during an exercise to train the NN model and a validation of the NN model, over a range of temperatures. The results indicate the temperature estimator effectively tracked the actual temperature over a wide range of temperatures and changes in temperatures, within a range of +/−4.5% for the exemplary system.

The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to determine exhaust gas temperature of an internal combustion engine during operation of the engine, comprising:
   determining states of a plurality of parameters of a combustion charge for the internal combustion engine using sensing devices;
   estimating a heat release of the combustion charge based upon the determined states of the plurality of parameters of the combustion charge, wherein the estimated heat release is calculated by a computer signally coupled to the sensing devices; and
   providing an estimate for the exhaust gas temperature in an exhaust system externally coupled to the engine, wherein the estimate for the exhaust gas temperature is calculated by the computer based upon the estimated heat release of the combustion charge.

2. The method of claim 1, wherein the parameters of the combustion charge comprise engine speed, mass air flowrate, engine fueling and fuel injection timing, and, recirculated exhaust gas fraction.

3. The method of claim 2, wherein the parameters of the combustion charge further comprise timing of intake valve closing.

4. The method of claim 3, wherein the parameters of the combustion charge further comprise a temperature of intake air to the engine.

5. The method of claim 1, wherein estimating the heat release of the combustion charge comprises regressing a non-linear temperature equation based upon the states of the parameters of the combustion charge.

6. The method of claim 1, wherein estimating the heat release of the combustion charge comprises executing a neural network model based upon the states of the plurality of parameters to determine a temperature increase in the combustion charge.

7. Article of manufacture, comprising a storage medium containing a machine-executable program operative to determine exhaust gas temperature of an internal combustion engine, the program comprising:
   code to determine states of a plurality of parameters of a combustion charge for the internal combustion engine during ongoing operation of the engine, wherein the states of the plurality of parameters are provided by sensing devices;
   code to calculate an estimate of a heat release of the combustion charge based upon the determined states of the plurality of parameters of the combustion charge; and
   code to provide an estimate for the exhaust gas temperature in an exhaust system externally coupled to the engine, wherein the estimate for the exhaust gas temperature is calculated based upon the estimated heat release of the combustion charge.

8. The article of claim 7, wherein the parameters of the combustion charge comprise engine speed, mass air flowrate, engine fueling and fuel injection timing, and, recirculated exhaust gas fraction.

9. The article of claim 8, wherein the parameters of the combustion charge further comprise timing of intake valve closing.

10. The article of claim 9, wherein the parameters of the combustion charge further comprise a temperature of intake air to the engine.

11. The article of claim 7, wherein the code to estimate the heat release of the combustion charge comprises code operative to regress a non-linear temperature model having as inputs the states of the parameters of the combustion charge.

12. The article of claim 11, further comprising a predetermined calibration stored in tabular form to determine a combustion charge temperature increase based upon one of the parametric states.

13. The article of claim 7, wherein the code to estimate the heat release of the combustion charge comprises code comprising an executable neural network model adapted to determine a temperature increase in the combustion charge based upon the states of the parameters.

14. The article of claim 7, further comprising the machine-executable code encoded therein to calculate the estimate for the exhaust gas temperature of the internal combustion engine at least once per second during ongoing operation.

15. The article of claim 7, wherein the internal combustion engine comprises a compression-ignition engine.

16. Method to determine an instantaneous exhaust gas temperature of a compression-ignition internal combustion engine mechanized for exhaust gas recirculation and operating in a premix combustion charge ignition mode during operation of the engine, comprising:

determining states of a plurality of parameters of a combustion charge for the compression-ignition internal combustion engine using sensing devices;

estimating a heat release of the combustion charge based upon the states of the parameters of the combustion charge, wherein the estimated heat release is calculated by a computer signally connected to the sensing devices; and providing an estimate for the exhaust gas temperature in an exhaust system externally coupled to the engine, wherein the estimate for the exhaust gas temperature is calculated by the computer based upon the estimated heat release and intake air temperature to the engine.

17. The method of claim 16, wherein the parameters of the combustion charge comprise a recirculated exhaust gas fraction.

18. The method of claim 17, wherein the parameters of the combustion charge further comprise timing of intake valve closing.

19. The method of claim 18, wherein the parameters of the combustion charge further comprise engine speed, mass air flowrate, engine fueling and fuel injection timing, and, the intake air temperature to the engine.

20. The method of claim 18, comprising a device for executing the method.

21. An apparatus for determining the exhaust gas temperature in an internal combustion engine during operation of the engine, comprising:

sensing devices operative to provide states of a plurality of parameters of a combustion charge for the internal combustion engine;

a computer signally coupled to the sensing devices and operative to calculate a difference between the exhaust gas temperature and intake air temperature to the internal combustion engine based upon the states of the plurality of parameters; and wherein the computer is further operative to provide an estimate for the exhaust gas temperature in an exhaust system externally coupled to the engine, where the estimate for the exhaust gas temperature is calculated based upon the calculated difference between the exhaust gas temperature and intake air temperature.

22. The apparatus of claim 21, wherein the computer is further operative to calculate a fuel/oxygen (fuel/O2) mass ratio for the combustion charge, and calculation of the difference between the exhaust gas and intake air temperature is based upon the calculated fuel/oxygen mass ratio.

* * * * *